United States Patent
Lu et al.

(10) Patent No.: US 7,530,144 B2
(45) Date of Patent: May 12, 2009

(54) POSITIONING STRUCTURE FOR A ROTATABLE HINGE

(75) Inventors: Sheng-Nan Lu, Shulin (TW); Chung-Yu Lee, Shulin (TW)

(73) Assignee: Shin Zu Shing Co., Ltd., Shulin (TW)

( * ) Notice: Subject to any disclaimer, the term of this patent is extended or adjusted under 35 U.S.C. 154(b) by 447 days.

(21) Appl. No.: 11/297,475

(22) Filed: Dec. 9, 2005

(65) Prior Publication Data
US 2007/0130727 A1 Jun. 14, 2007

(51) Int. Cl.
*E05C 17/64* (2006.01)
(52) U.S. Cl. .................... 16/342; 16/367; 16/371
(58) Field of Classification Search ............ 16/342, 16/374, 366, 371, 367; 248/917, 919, 922, 248/923; 361/680–683
See application file for complete search history.

(56) References Cited

U.S. PATENT DOCUMENTS

| | | | | |
|---|---|---|---|---|
| 6,742,221 B2* | 6/2004 | Lu et al. | | 16/367 |
| 6,845,546 B1* | 1/2005 | Lu et al. | | 16/367 |
| 6,883,206 B2* | 4/2005 | Yang et al. | | 16/337 |
| 7,047,598 B2* | 5/2006 | Huang | | 16/312 |
| 7,076,837 B2* | 7/2006 | Liao | | 16/371 |
| 7,159,279 B2* | 1/2007 | Liu et al. | | 16/367 |
| 7,189,023 B2* | 3/2007 | Kang et al. | | 403/119 |
| 7,234,204 B2* | 6/2007 | Liu et al. | | 16/367 |
| 2005/0251965 A1* | 11/2005 | Lu et al. | | 16/367 |

* cited by examiner

*Primary Examiner*—William L. Miller
(74) *Attorney, Agent, or Firm*—Hershkovitz & Associates, LLC; Abraham Hershkovitz

(57) ABSTRACT

A rotatable hinge includes a fixed frame provided to be adapted for engagement with a laptop computer base and a rotatable portion rotatable relative to the fixed frame and provided to be adapted for engagement with a laptop computer screen. The fixed frame is composed of a circular wall and a connection base integrally formed with the circular wall. The rotation portion has an extension extending from a bottom of the sleeve to be received in a through hole defined in the circular wall so that the rotation portion is able to be rotatable relative to the fixed portion. The extension has a flange formed thereon and a sectorial block formed on an outer periphery of the flange. The circular wall has a limiting boss formed on a peripheral edge thereof to be selectively connected to the sectorial block so as to limit the rotational movement of the rotation portion relative to the fixed frame.

6 Claims, 8 Drawing Sheets

POSITIONING STRUCTURE FOR A ROTATABLE HINGE

BACKGROUND OF THE INVENTION

1. Field of the Invention

The present invention relates to a positioning structure, and more particularly to positioning structure for a rotatable hinge so that when the cover is rotated relative to the base, the positioning structure is able to help position the cover relative to the base to prevent damage to both the cover and the base resulting from excessive rotation.

2. Description of the Prior Art

A hinge is provided to allow two objects to pivot relative to one another. The most application field is in the laptop computers. A laptop computer has a screen and a base connected to the screen via the hinges. Therefore, the hinge provides a friction force to the screen when the screen is detached from the base so as to hold the screen in position. When requirements from users to the laptop computers increase, a conventional hinge which provides only the friction to the screen cannot satisfy the user. Therefore, an improved hinge is developed to the market to provide a rotation ability to allow the screen to rotate horizontally relative to the base. As a result of the screen being rotatable relative to the base, the user is able to rotate the screen to allow the viewers at positions different from that of the user to see the information without moving the entire laptop computer.

However, when this type of hinge is in application, the screen or the base may be easily damaged due to excessive rotation of the screen relative to the base.

To overcome the shortcomings, the present invention tends to provide an improved positioning structure to mitigate the aforementioned problems.

SUMMARY OF THE INVENTION

The primary objective of the present invention is to provide a positioning structure for the rotatable hinge so that damage to the screen or the base resulted from excessive rotation of the screen relative to the base is decreased.

In order to accomplish the foregoing objective, the rotatable hinge includes a rotatable portion adapted for engagement with a screen of a laptop computer and a fixed frame adapted for engagement with a base of the laptop computer. The rotation portion is provided with a first washer and a second washer securely mounted around an extension extending from a bottom of the rotation portion. The fixed frame is provided with a stationary washer firmly mounted on the fixed frame and having two cutouts defined in an inner periphery defining the through hole of the through hole of the stationary washer to correspond to bosses respectively formed on a bottom face of the first washer and a top face of the second washer such that when the bosses of the first washer and of the second washer are received in the cutouts of the stationary washer, the rotation portion is positioned by the fixed frame.

In yet another objective of the present invention, the rotation portion is provided with a sectorial protrusion and the fixed frame has a stop such that when the rotation portion is rotated relative to the fixed frame, engagement between the sectorial protrusion and the stop limit the rotation angle of the rotation portion to the fixed frame.

Other objects, advantages and novel features of the invention will become more apparent from the following detailed description when taken in conjunction with the accompanying drawings.

DETAILED DESCRIPTION OF THE PREFERRED EMBODIMENT

Figure 1:
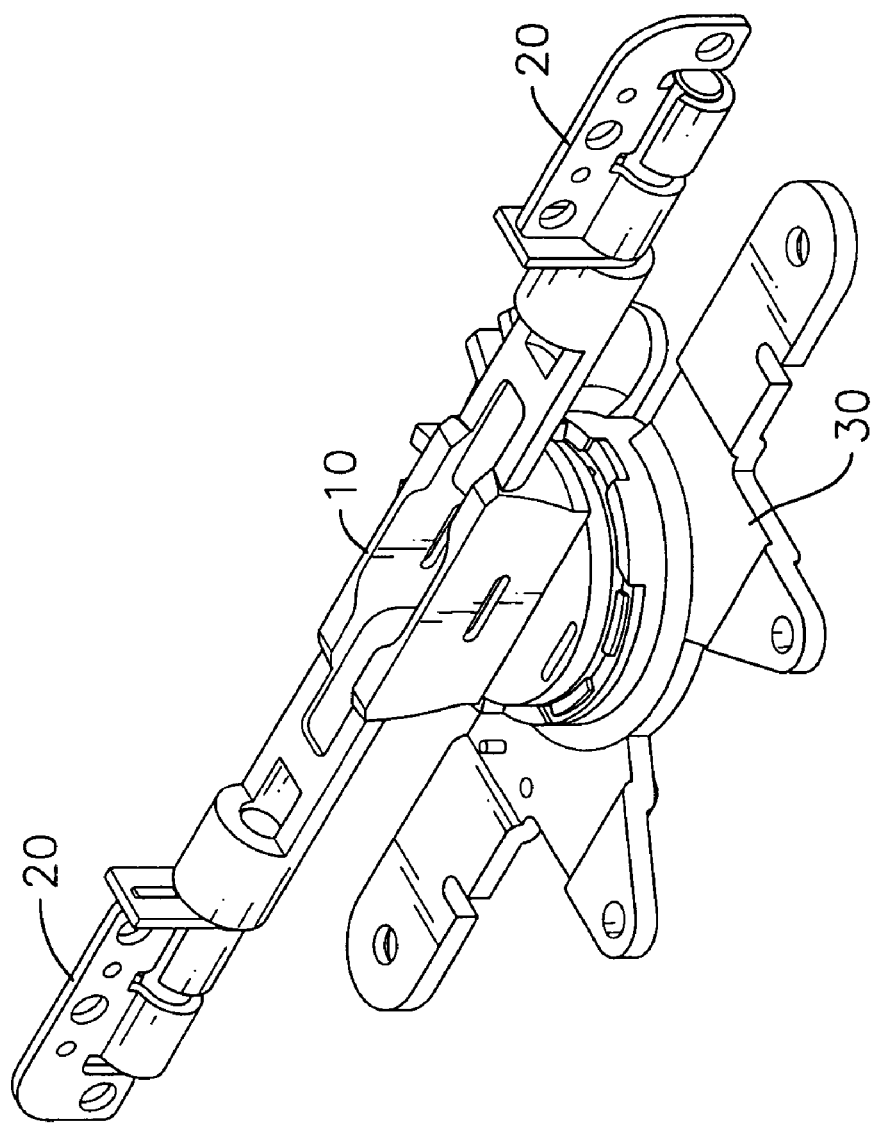
FIG. 1 is a perspective view of the rotatable hinge of the present invention.
Figure 2:
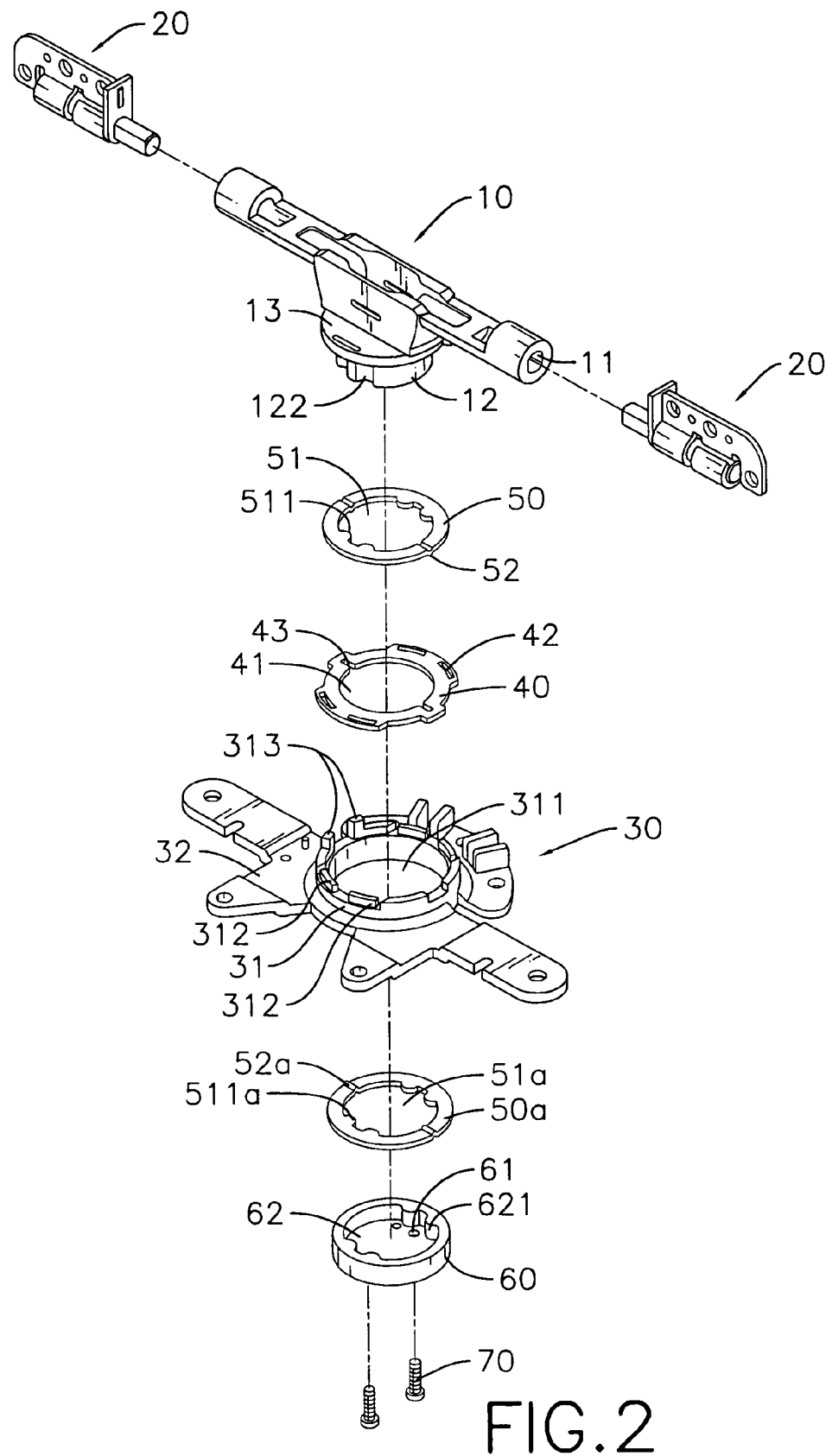
FIG. 2 is an exploded perspective view showing the parts of the rotatable hinge in FIG. 1.

With reference to FIGS. 1 and 2, it is noted that the rotatable hinge in accordance with the present invention includes a rotation portion (10) with two sleeves (11) extending from two opposite sides of the rotation portion (10), two securing devices (20) respectively and pivotally connected to the sleeves (11), a fixed frame (30), a first washer (50) mounted between the rotation portion (10) and the fixed frame (30) and a stop (60) securely connected to the rotation portion (10) via securing elements (70). Furthermore, a second washer (50a) is mounted between the stop (60) and the fixed frame (30) and a stationary washer (40) is mounted between the fixed frame (30) and the first washer (50).

Figure 3:
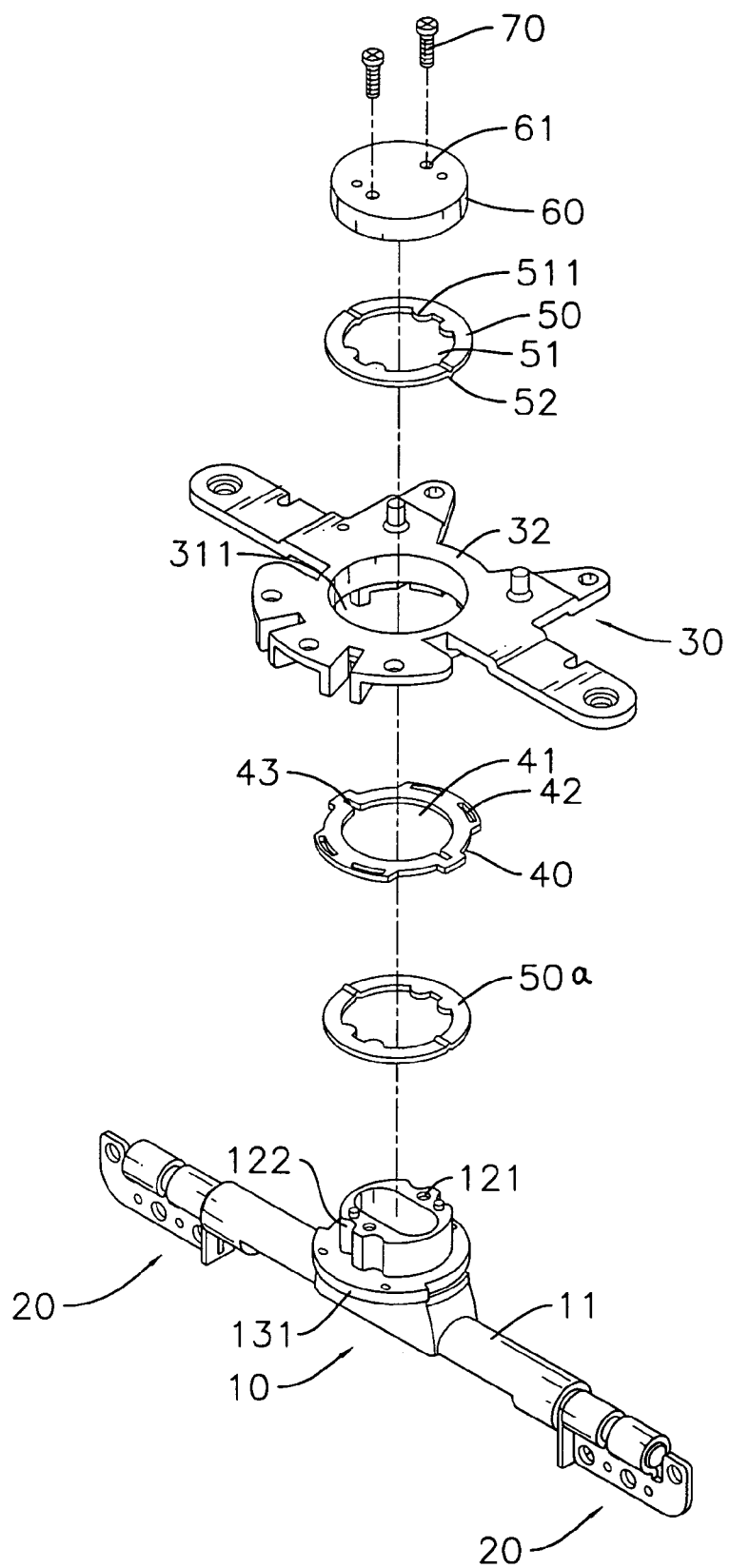
FIG. 3 is an exploded perspective view showing the parts of the rotatable hinge in FIG. 1 from a different angle.
Figure 3A:
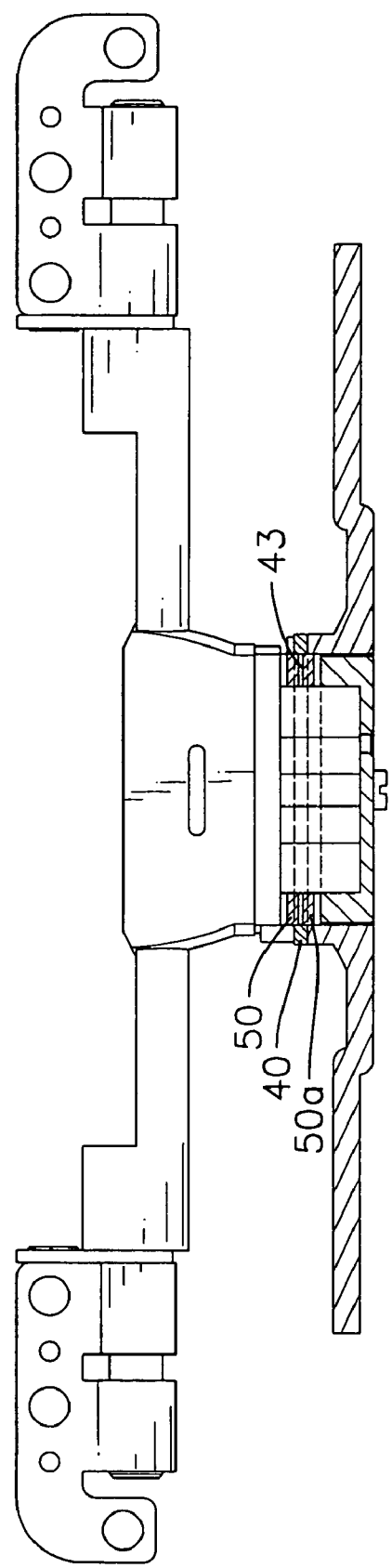
FIG. 3A is a schematic cross sectional view showing that the bosses are received in the cutout of the third washer.
Figure 4:
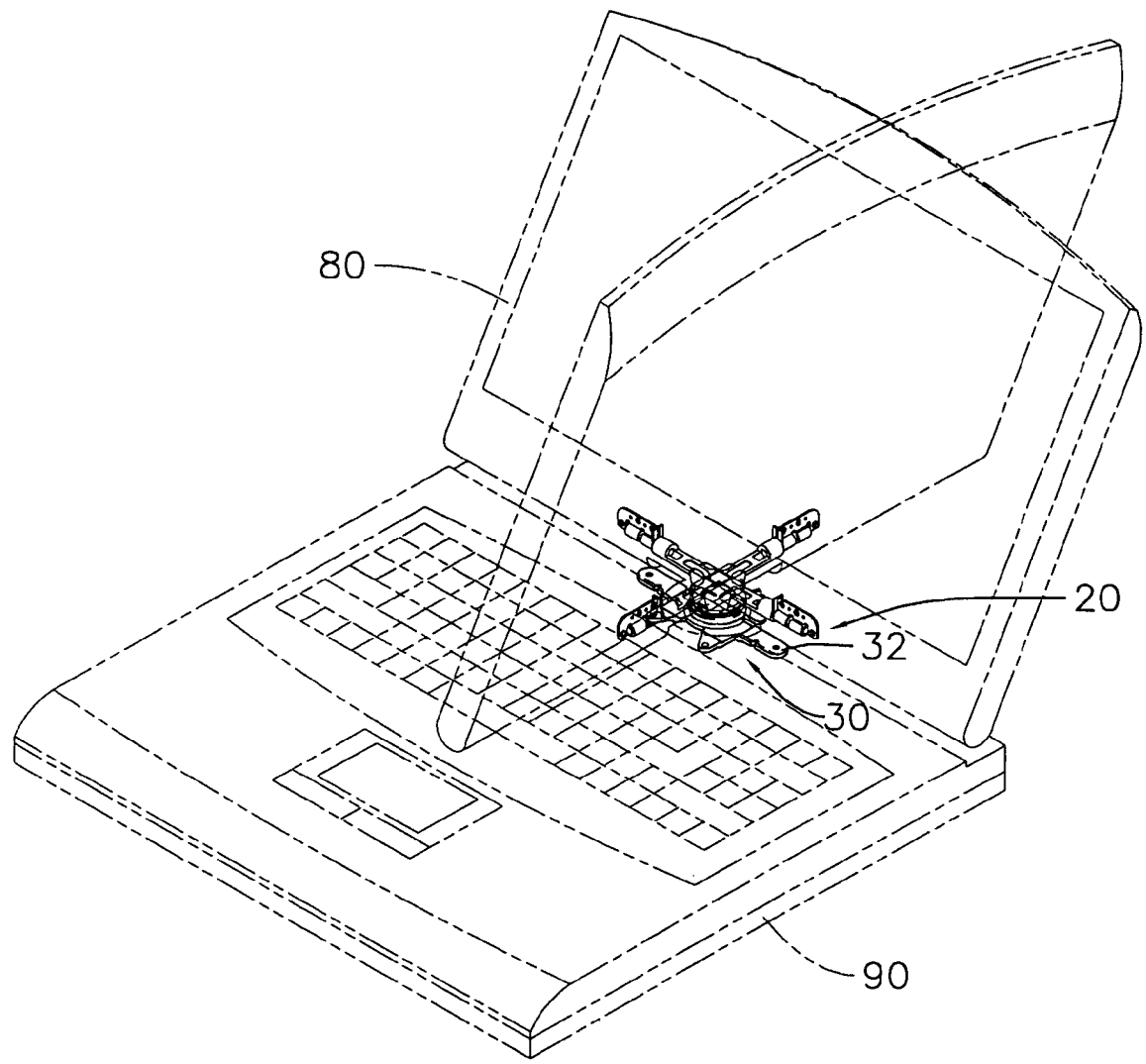
FIG. 4 is an operational schematic view showing the rotation of the rotation portion relative to the fixed frame.

With reference to FIGS. 2 and 3, it is noted that the rotation portion (10) includes an extension (12) extending from a bottom of the rotation portion (10) and having positioning holes (121) defined in a bottom of the extension (12) and multiple elongated recesses (122) defined in an outer periphery of the extension (12). A flange (13) is integrally formed between the rotation portion (10) and the extension (12) and has a sectorial block (131) extending from a periphery of the flange (13). Details of how the securing devices (20) are connected to the sleeves (11) of the rotation portion (10) are conventional in the art and omitted hereinafter.

The fixed frame (30) is composed of a circular wall (31) and a connection base (32) which is adapted for engagement with the base of a laptop computer and integrally formed with the circular wall (31). The circular wall (31) has a through hole (311) defined through the circular wall (31) and the connection base (32), multiple protrusions (312) formed on a top peripheral edge of the circular wall (31) and two limiting bosses (313) formed on the top peripheral edge of the circular wall (31) to correspond to the sectorial block (131) of the rotation portion (10).

A first washer (50) is mounted between the rotation portion (10) and the fixed frame (30) and has a first through hole (51) defined therethrough and provided with fingers (511) formed on an inner face defining the first through hole (51) and two opposite first bosses (52) formed on a bottom face of the first washer (50).

A second washer (50a) is provided between the stop (60) and the first washer (50) and a second through hole (51a), multiple second fingers (511a) formed on an inner periphery defining the second through hole (51a) and two opposite second bosses (5a) formed on a top face of the second washer (50a), which are the same as those of the first washer (50).

A stationary washer (40) is provided with a through hole (41) having a diameter the same as those of the first washer (50) and the second washer (50a), elongated holes (42) defined in a periphery of the stationary washer (40) to correspond to the protrusions (312) of the circular wall (31) of the fixed frame (30) and two cutouts (43) oppositely defined in an inner periphery defining the through hole (41) of the stationary washer (40) to correspond to the two opposite first bosses (52) of the first washer (50) and the two opposite second bosses (52a) of the second washer (50a).

The stop (60) includes a closed end and an open end. The stop further has apertures (61) defined through the closed end to correspond to the positioning holes (121) of the extension (12) of the rotation portion (10), a recess (62) defined in the stop (60) and multiple third fingers (621) defined in an inner periphery defining the recess (62).

When the rotation hinge of the present invention is assembled, it is noted that the first washer (50) is mounted around the extension (12) with the first fingers (511) received in the elongated recesses (122) of the extension (12). The stationary washer (40) is securely mounted on the peripheral edge of the circular wall (31) via the protrusions (312) being riveted in the corresponding holes (42). Then after the extension (12) with the first washer (50) mounted therearound is extended through the through hole (311) of the fixed frame (30), the second washer (50a) is mounted around the extension (12) with the second fingers (511 a) being received in the corresponding elongated recesses (122). Thereafter, the stop (60) is inserted into the through hole (311) to allow the securing elements (70), such as threaded bolts of rivets, to extend into the aligned apertures (61) of the stop (60) and the positioning holes (121) of the extension (12) so as to secure engagement between the stop (60) and the extension (12).

It is noted that the stop (60) has an outer diameter the same as that of the second washer (50a) and the first washer (50). Yet the outer diameter of the first washer (50) is smaller than the outer diameter of the stationary washer (40) and bigger than an inner diameter of the stationary washer (40) such that the first washer (50) is sandwiched between the flange (13) and the stationary washer (40) and the second washer (50a) is sandwiched between the stationary washer (40) and the stop (60).

Because the first washer (50), the second washer (50a) and the stop (60) are securely connected to the extension (12) of the rotation portion (10) and the stationary washer (40) is firmly mounted on top of the circular wall (31) of the fixed frame (30), the rotation portion (10) is able to rotate relative to the fixed frame (30).

With reference to FIG. 3, it is noted that when the securing devices (20) are provided to secure engagement with a laptop computer screen (80) and the fixed frame (30) is provided to secure engagement with a laptop computer base (90), the screen (80) is able to rotate relative to the base (90).

Figure 5:
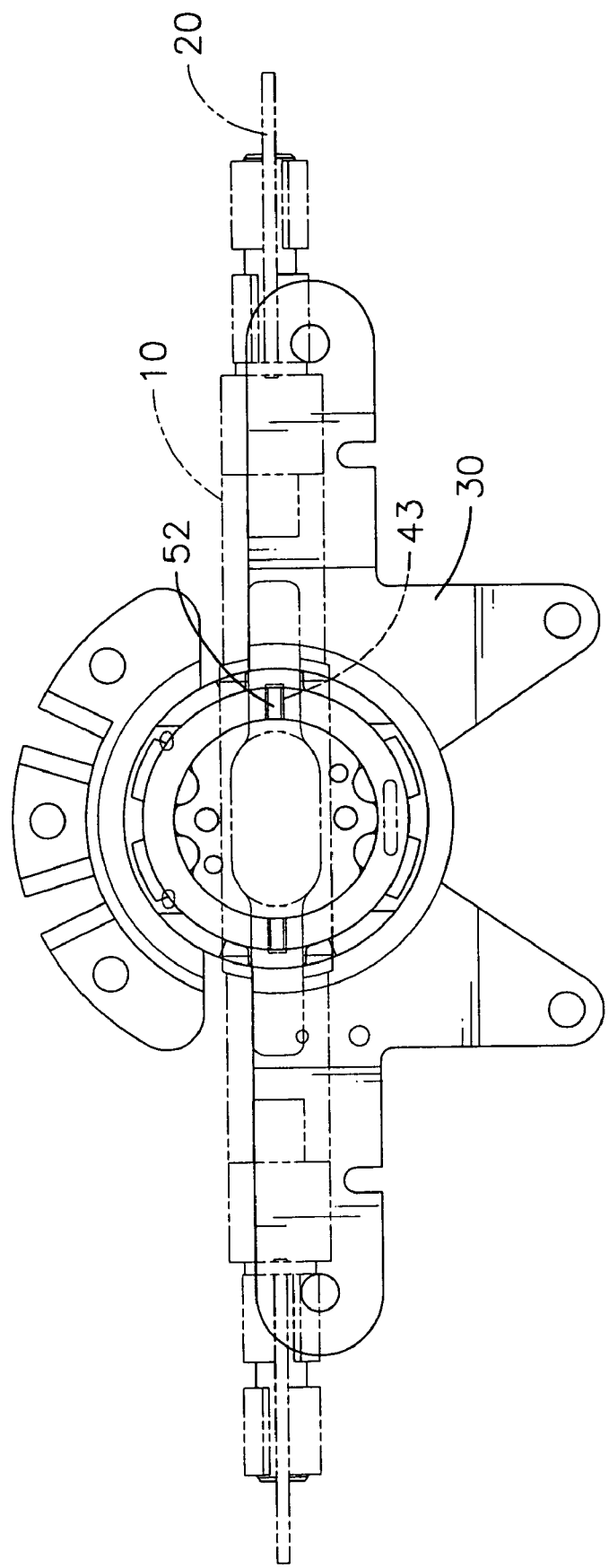
FIG. 5 is a schematic cross sectional view showing that the bosses of the first washer and of the second washer are received in the cutout in the third washer so as to position the rotation portion relative to the fixed frame.
Figure 6:
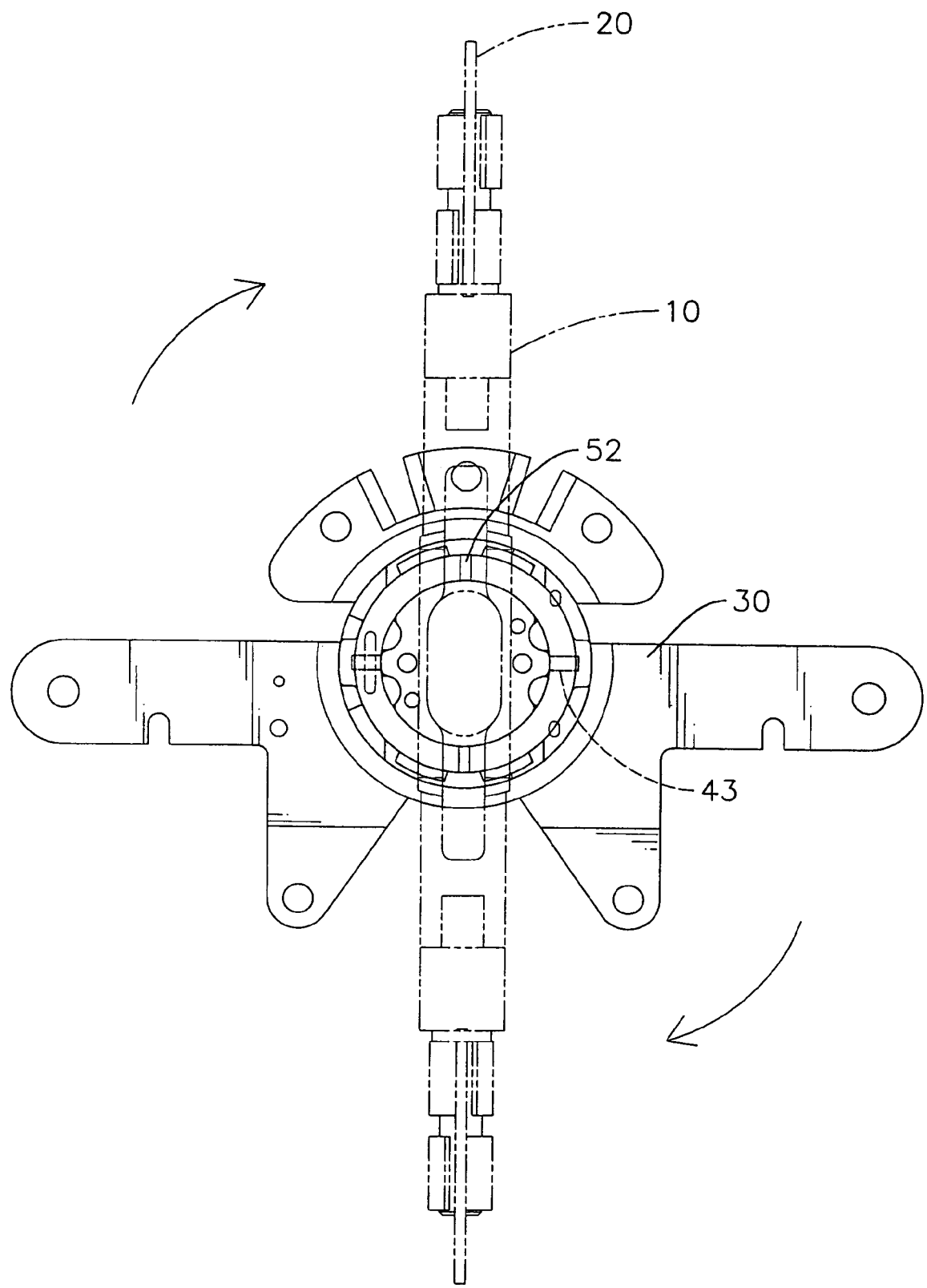
FIG. 6 is a schematic cross sectional view showing that the bosses are moved away from the cutout of the third washer.

In addition, with reference to FIGS. 5 and 6, when the first bosses (52) of the first washer (50) and the second bosses (52a) of the second washer (50a) are received in the upper portion and the lower portion of the cutouts (43) of the stationary washer (40), a temporary positioning effect is provided to the screen (80) relative to the base (90). At the same time, a side of the sectorial block (131) is engaged with the limiting boss (313) of the circular wall (31) to limit rotation angle of the rotation portion (10) to the fixed frame (30), as depicted in FIGS. 2 and 3.

Figure 7:
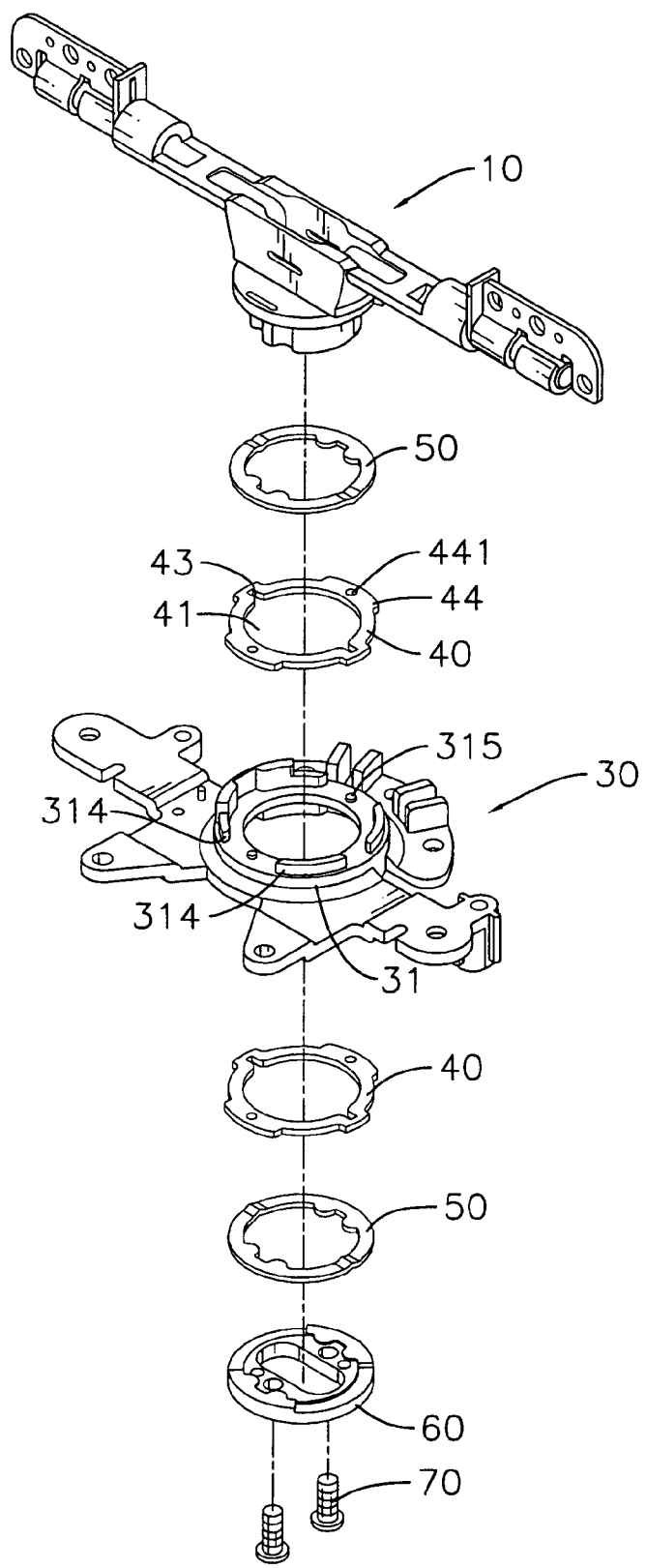
FIG. 7 is an exploded perspective view of a different embodiment of the rotatable hinge of the present invention.

With reference to FIG. 7, it is noted that the stationary washer (40) may be provided with a limiting section (44) formed from an outer periphery of the stationary washer (40) and having a securing hole (441) defined through the limiting section (44). The circular wall (31) may be provided with bars (314) formed on a top peripheral edge of the circular wall (31) and a protrusion (315) formed between two adjacent bars (314) of the circular wall (31). Therefore, when the stationary washer (40) is to be mounted on top of the circular wall (31), the limiting section (44) is sandwiched between two adjacent bars (314) and the protrusion (315) is received and riveted in the securing hole (441) so as to firmly fix the stationary washer (40) on the fixed frame (30).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. In a rotatable hinge including a fixed frame adapted for engagement with a laptop computer base and a rotation portion rotatable relative to the fixed frame and adapted for engagement with a laptop computer screen, the fixed frame including a circular wall and a connection base integrally formed with the circular wall and configured in such a way that the connection base is engageable with the laptop computer base, the rotation portion having a sleeve, two securing devices respectively provided to two different ends of the sleeve and an extension extending from a bottom of the sleeve to be received in a through hole defined in the circular wall so that the rotation portion is rotatable relative to the fixed frame, wherein the improvements comprise:

the extension having a flange formed thereon and a sectorial block formed on an outer periphery of the flange, the circular wall having a limiting boss formed on a peripheral edge thereof to be selectively connected to the sectorial block so as to limit the rotational movement of the rotation portion relative to the fixed frame, the circular wall having protrusions formed on the peripheral edge thereof, the extension having a stationary washer and the stationary washer having holes defined to correspond to the protrusions of the circular wall such that the protrusions are received and riveted in the holes to secure engagement between the stationary washer and the circular wall.

2. The rotatable hinge as claimed in claim 1, wherein the extension further has a first washer and a second washer securely mounted therearound, and the stationary washer is provided between the first washer and the second washer so that the first washer and the second washer are rotatable relative to the stationary washer.

3. The rotatable hinge as claimed in claim 2, wherein the holes of the stationary washer are elongated.

4. The rotation hinge as claimed in claim 3, wherein the extension has elongated recesses defined in an outer periphery thereof and the first washer has first fingers formed on an inner periphery defining a first through hole therethrough and the second washer has second fingers formed on an inner periphery defining a second through hole thereof so that after the first washer and the second washer are mounted around the extension of the rotation portion, the first fingers and the second fingers are received in the elongated recesses to secure engagement among the first washer, the second washer and the extension.

5. The rotation hinge as claimed in claim 2, wherein the extension has elongated recesses defined in an outer periphery thereof and the first washer has first fingers formed on an inner periphery defining a first through hole therethrough and the second washer has second fingers formed on an inner periphery defining a second through hole thereof so that after the first washer and the second washer are mounted around the extension of the rotation portion, the first fingers and the second fingers are received in the elongated recesses to secure engagement among the first washer, the second washer and the extension.

6. The rotatable hinge as claimed in claim 2, wherein the first washer has two oppositely formed first bosses formed on a bottom thereof and the second washer has two oppositely formed second bosses formed on a top thereof and the stationary washer has two oppositely defined cutouts defined in an inner periphery defining a through hole thereof to correspond to and selectively receive therein the first bosses and the second bosses so that a positioning effect is provided to the rotation portion relative to the fixed frame.

* * * * *